United States Patent
Levy

(10) Patent No.: US 12,496,859 B2
(45) Date of Patent: Dec. 16, 2025

(54) TIRE TRACTION DEVICE

(71) Applicant: Peter L. Levy, San Francisco, CA (US)

(72) Inventor: Peter L. Levy, San Francisco, CA (US)

(*) Notice: Subject to any disclaimer, the term of this patent is extended or adjusted under 35 U.S.C. 154(b) by 574 days.

(21) Appl. No.: 16/914,275

(22) Filed: Jun. 27, 2020

(65) Prior Publication Data
US 2021/0402834 A1    Dec. 30, 2021

(51) Int. Cl.
*B60C 27/04* (2006.01)
*B60B 15/22* (2006.01)

(52) U.S. Cl.
CPC .............. *B60C 27/04* (2013.01); *B60B 15/22* (2013.01)

(58) Field of Classification Search
CPC ..... B60C 27/006; B60C 27/02; B60C 27/023; B60C 27/0261; B60C 27/0269; B60C 27/04; B60B 15/22
See application file for complete search history.

(56) References Cited

U.S. PATENT DOCUMENTS

| | | | | |
|---|---|---|---|---|
| 2,598,851 A * | 6/1952 | Spevak | ................... | B60C 27/04 301/43 |
| 3,473,593 A * | 10/1969 | Brown | ................ | B60C 27/0269 152/218 |
| 4,576,214 A * | 3/1986 | Preusker | ................. | B60C 27/14 152/213 A |
| 10,744,818 B1 * | 8/2020 | Baker | ..................... | B60B 15/26 |
| 11,155,131 B1 * | 10/2021 | Droznin | ................ | B60B 15/263 |

* cited by examiner

*Primary Examiner* — Jason R Bellinger
(74) *Attorney, Agent, or Firm* — Walt Froloff

(57) ABSTRACT

A tire traction device for a motor vehicle wheel having a simple radial rod construction coupled to a standard wheel lug bolt via a conical mounting bracket and stabilizing rod set cable coupling.

10 Claims, 5 Drawing Sheets

TIRE TRACTION DEVICE

BACKGROUND

Field of the Invention pertains generally to devices for motor vehicular wheels to improve traction on slippery surfaces and particularly to a device which can be easily installed, adjusted and removed under adverse conditions while fitting a range of wheel sizes.

Background of the Invention

There are a plethora of anti-skid devices fitting on wheels to improve traction on slippery surfaces. For example, some have arms which are adjustable to account for spacing differences. Once installed and the arms are extended, a cover and a plate is attached over the wheel hub to lock the arms into position.

Another such device uses hooks which fit around the surface of the tire. The hooks are rigidly attached to arms which extend over the outside of the tire and which are held in place by a ring chain. Others implement a vehicle tire which comprises a plurality of arms extending radially from the center of the tire to the outer surface, the ends of which have cleats which wrap around the surface of the tire. The arms to which the cleats are attached are telescoping for proper positioning.

Still others disclose a traction device having a circular hub to which a plurality of traction fingers on supporting shanks are attached and which are equally spaced around the tire. However these traction devices fail to use ready provided standard motor vehicle wheel components instead adding superfluous components for providing a complex device with hardship in installation which is unwarranted and certainly unappreciated under the adverse conditions where better or additional tire traction becomes a necessary part of travel.

Some existing tire traction solutions are installation inflexible, complicated to install and expensive to manufacture. In some cases this is because in some cases the traction holding rod is not directly attached to lug but has an added wheel attachment. What is needed is simple coupling to existing wheel lug bolts. Installation release mechanisms in some key turn devices increase the difficulty in installation. Mounting and installing directly to a wheel lug bolt would make installation cheaper faster better.

But there are deficiencies in all these prior art which hinders or prevents its useful application in the tire traction market. What is needed is an anti-skid traction device designed to be easily mounted onto a wheel for obtaining greater traction on ice, snow, mud or sand, or in situations where an automobile has been impaired by road conditions. What is needed is an invention designed to replace snow chains and which provides safety for the road, the environment and the user, in a cost effective manner. What is needed are a tire attaching traction device which is easy to install, and can and can be mass-produced at low cost. What is needed is a tire traction device which is self adjusting, not requiring any further length component length adjustments for different size of tires.

SUMMARY

The present invention discloses a tire traction device for a motor vehicle wheel with a tire and a standard lug configuration having a hub mounting plate coupled to the wheel via a standard lug bolt-nut set. The mounting plate has an inner concentric ring of fitting a standard wheel bolt hole set and an outer concentric ring of holes with a transition region from the smaller inner hole ring to the larger concentric hole ring and conically outward from the inner to the outer concentric ring. The outer ring having an at least 5 hole set for bolt-nut fastener coupling for at least 5 tire rods and each tire rod is coupled to the mounting plate outer ring hole set, positioned in the wheel radial plane having a rod length extending to the wheel tire tread. Each tire rod has two ends, a first end having a hole coupled for coupling the mounting plate through an outside ring hole and a second end having a component orthogonal to the wheel radial plane and snuggly parallel and to a tire tread, the rod has a distal end with bent tip extending towards the wheel radial center for addition traction device stability under wheel motion. The rod orthogonal components have two surfaces more-or-less parallel to a tire tread surface, a first surface adjacent to the tire tread surface with a roughness for adherence to a tire tread surface and a second surface facing away from the tire and adjacent a road surface for providing traction to the road under wheel rotation, such that a pre-installed mounting plate on a standard motor vehicle wheel provides a simple easy way to increase wheel traction using a single nut per traction rod providing added wheel traction.

Each rod has a rigid loop midway for threading a cable connecting all of the rods under tensioning together adding stability to the traction device through rod force distribution.

BRIEF DESCRIPTION OF DRAWINGS

Specific embodiments of the invention will be described in detail with reference to the following figures.

DETAILED DESCRIPTION

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Objects and Advantages

The tire traction device disclosed herein addresses the above needs and concerns in the following manner.

It is, therefore, an object of the invention to provide a traction device for tires which is easily and rapidly mounted, self adjusting and detached.

Another object of the invention is to provide an attachment for tires for traction on ice or snow, which may be attached to and detached from the tire by any person with a single lug wrench.

A still further object of the invention is to provide a traction device which is small in size and easily portable with minimum of storage.

Yet another object of the present invention is to provide a tire traction device which is adjustable to fit tires of various sizes and diameters but without extra or elaborate mechanisms for lengthening or shortening components and hence adding complexity to installation or adjustment to fit a specific tire.

A further object of the present invention is to provide a simple traction device which is inexpensive to the manufacturer and easy to install by a consumer under adverse weather conditions.

An object of the invention is to provide a rod curved at top and with rubber tip for less wear on tire and better fit than current straight top traction bar configurations.

Another object of the invention is to provide a strong plastic rod with steel-tungsten traction components reduce costs and increase stability of the traction device.

Yet another object of the invention is to provide traction device stability via cable a tension coupling the rods through rod midsection loop The present invention discloses several embodiments for making a motor vehicle wheel tire traction device.

Figure 1:
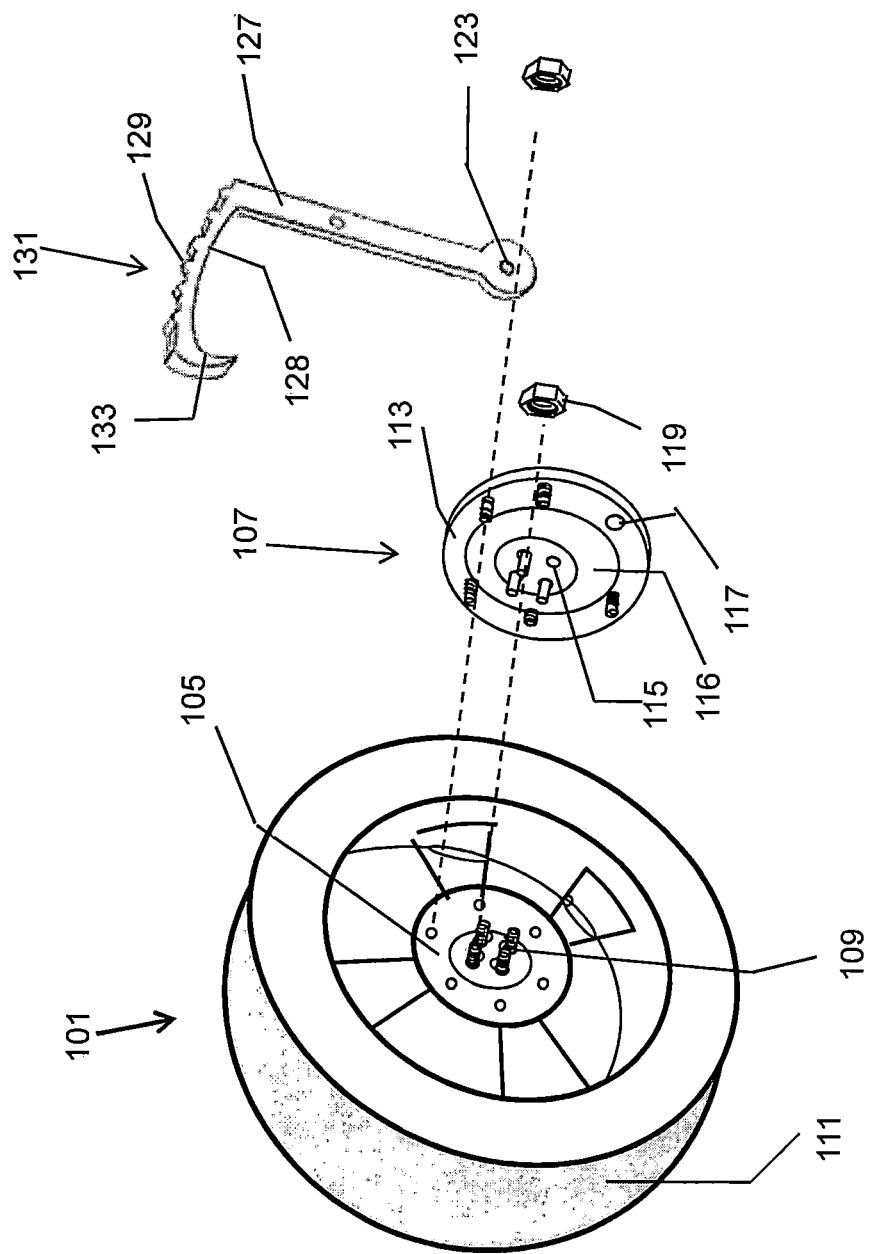
FIG. 1 illustrates an assemble drawing of a tire traction device in an embodiment of the invention

FIG. 1 illustrates an assemble drawing of a tire traction device in an embodiment of the invention.

A tire traction device for a motor vehicle standard wheel 101 with a tire 111 and a standard lug configuration 109 having a hub plate 105 coupled to the wheel via standard lug bolt-nut set 109 is shown. The mounting plate 107 has an inner concentric ring of standard wheel bolt holes 115 and an outer concentric ring 113 of bolt holes 117 with a transition region 116 from the smaller inner hole ring 115 to the larger concentric hole ring 113 and conically outward from the inner 115 to the outer concentric ring 113. The outer ring 113 having an at least 5 hole set for bolt-nut fastener 117 coupling for at least 5 tire rods 131. Each tire rod 131 is coupled to the mounting plate outer ring hole set 117, rod 127 end 123 coupled in the wheel radial plane having a rod length 127 extending to the wheel tire tread. Each tire rod 131 has two ends, a first end having a hole 123 firmly coupled to a mounting plate 107 through an outside ring bolt-lug nut 1179 coupling and a rod 127 second end having a component 129 orthogonal to the wheel radial plane and snuggly parallel and to a tire 111 tread, the rod 131 having a distal end bent tip 133 extending towards the wheel 101 radial center. Each rod 127 orthogonal component 129 has two surfaces more-or-less parallel to a tire 111 tread surface. A first surface 128 is adjacent to the tire 111 tread surface with a roughness for adherence to a tire tread surface and a surface facing away from the tire 111 and adjacent a road surface for providing traction to the road under wheel rotation. With a pre-installed mounting plate 107 fitting on a standard motor vehicle wheel 101 the installation of the embodiment traction device is straight forward and an easy one wrench to increase to increase wheel traction using a single nut per traction rod for added wheel traction and without lifting the vehicle or freeing to free wheel lug nuts 119.

Figure 2:
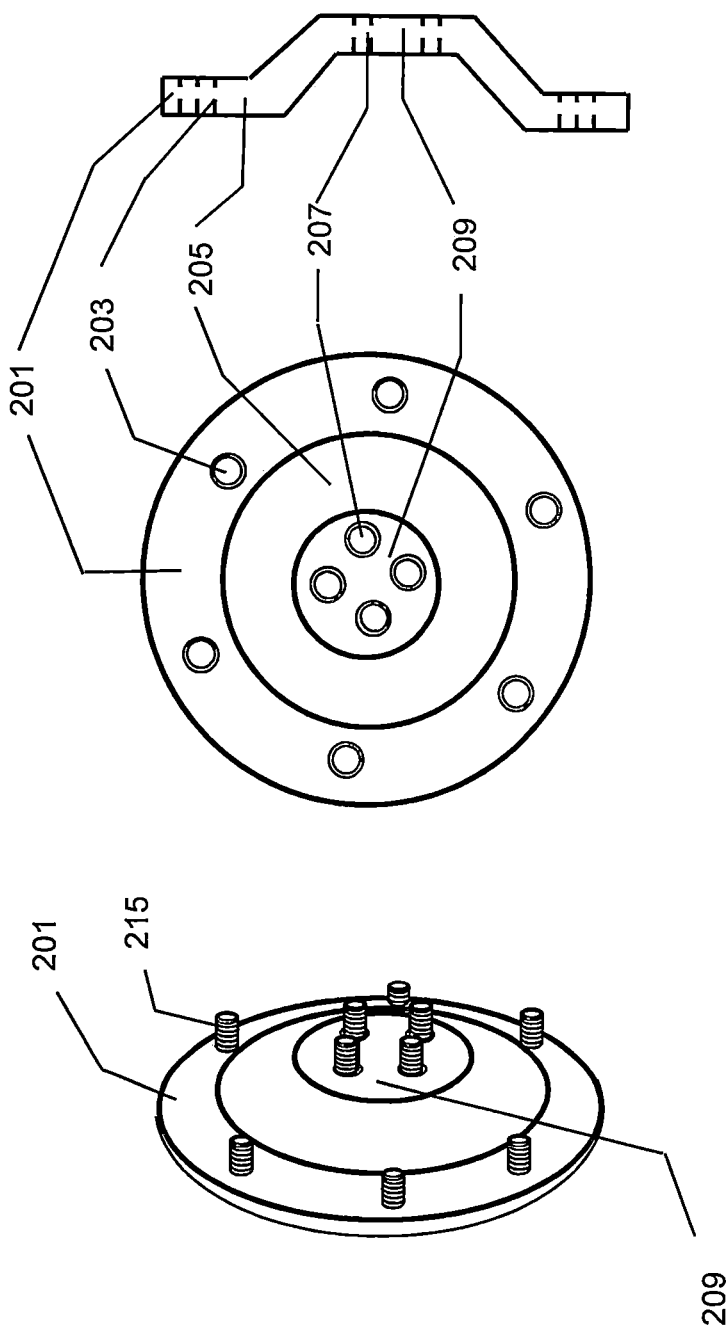
FIG. 2 shows a wheel hub plate for an embodiment of the invention.

FIG. 2 shows three views of a wheel hub mounting plate in an embodiment of the invention.

A mounting plate has an inner concentric ring 209 of standard wheel lug bolt holes 207 and an outer concentric ring 201 of holes 203 with a slightly conical transition region 205 from the smaller inner hole ring 209 to the larger concentric hole ring 201 and conically outward from the inner 209 to the outer concentric ring 201.

The outer ring 201 has at least 5 hole 203 set for bolt-nut 215 fastener coupling for at least 5 tire rods. The mounting plate may be of solid metal alloy material or and threaded outer ring 201 holes 203 in some embodiments.

Figure 3:
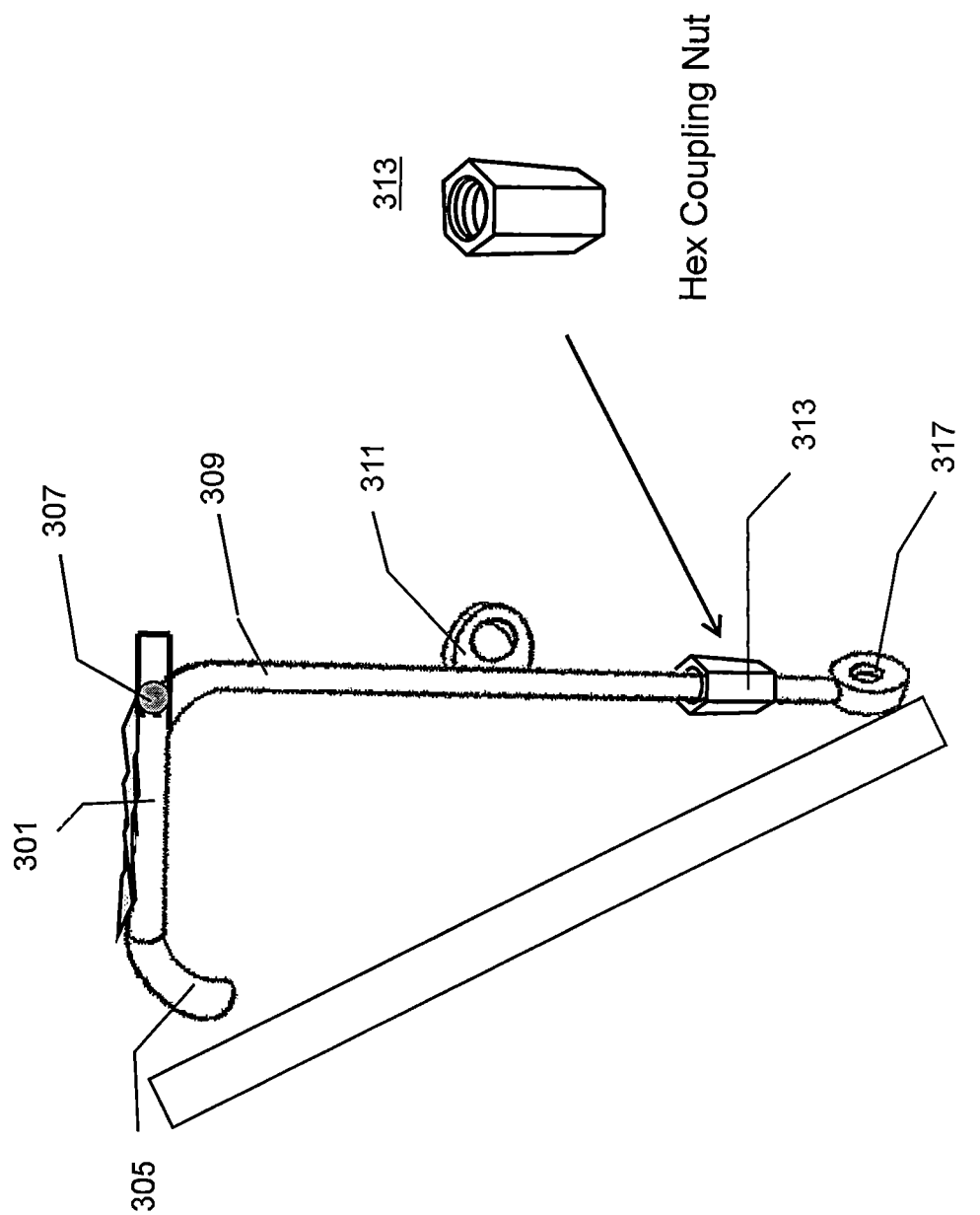
FIG. 3 illustrates a rod orthogonal traction component with securing loop and coupling nut in aspect of the invention.

FIG. 3 illustrates a rod orthogonal traction component with rod securing loop and coupling nut in aspect of the invention.

An orthogonal rod component 301 rotationally coupled at pivot 307 to a rod 309 is shown. A rod 309 has a hole 317 at the mounting plate coupling end, for an one bolt-nut fastener coupling to a wheel. In an embodiment of the invention nut coupler 313 providing simple and easy rod 309 extensions for tire radius adjustment is shown. In yet another embodiment of the invention a rubber tip 305 from that orthogonal rod component 301 is used to stabilize any tire lateral motion from the rod and a rigid loop 311 on rod 309 provides stability in the radial dimension.

Figure 4:
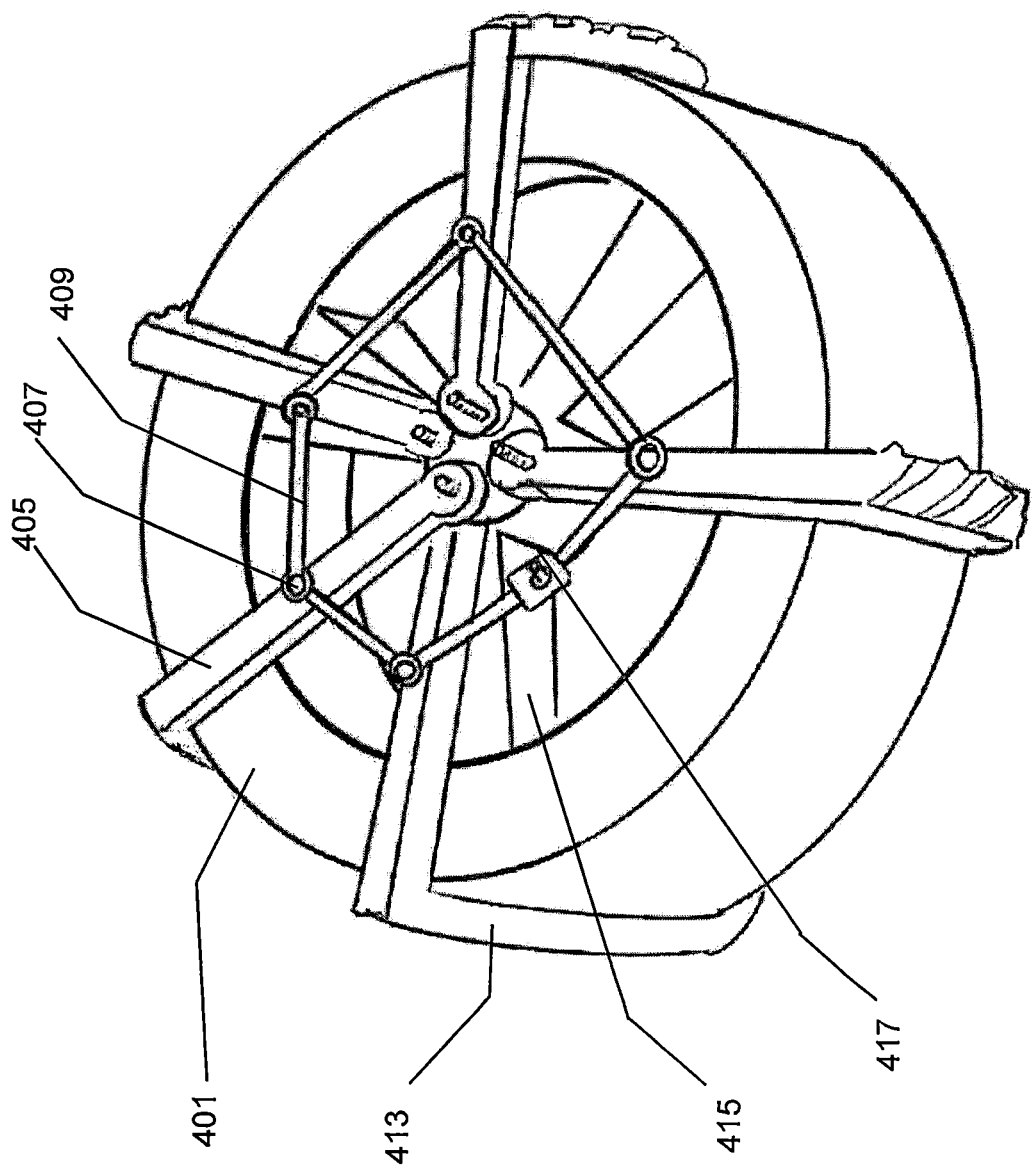
FIG. 4 illustrates a rod set with mid-rod loop coupling in embodiment of the invention.

FIG. 4 illustrates a tire traction rod 405 set with mid-rod loop 407 coupling bar 409 in embodiment of the invention. A tire 401 on a standard wheel 415 with rod 405 and orthogonal rod component 413 installed independently on the tire 401 are shown. Each rod 405 has a midsection loop 407 for threading a rod set connecting flexible cable or rope and tensioning the connecting cable 409 for additional traction rod 405 set stability. Each rod 405 has a rigid ring-like loop 407 midway on each rod for threading cord or cable 409 connecting all of the rods, for threading and tensioning a cable for coupling all of the rods together for added stability by distributing traction forces transmitted to the rod 405. The cable 409 has a terminal snap 417, buckle or otherwise easy cable locking mechanism for sustained tension in the cable 409 commensurate to road traction perturbation forces placed on the rods 405 for providing a stable vibration resisting rod 405 positions from road jarring and device perturbation.

Figure 5:
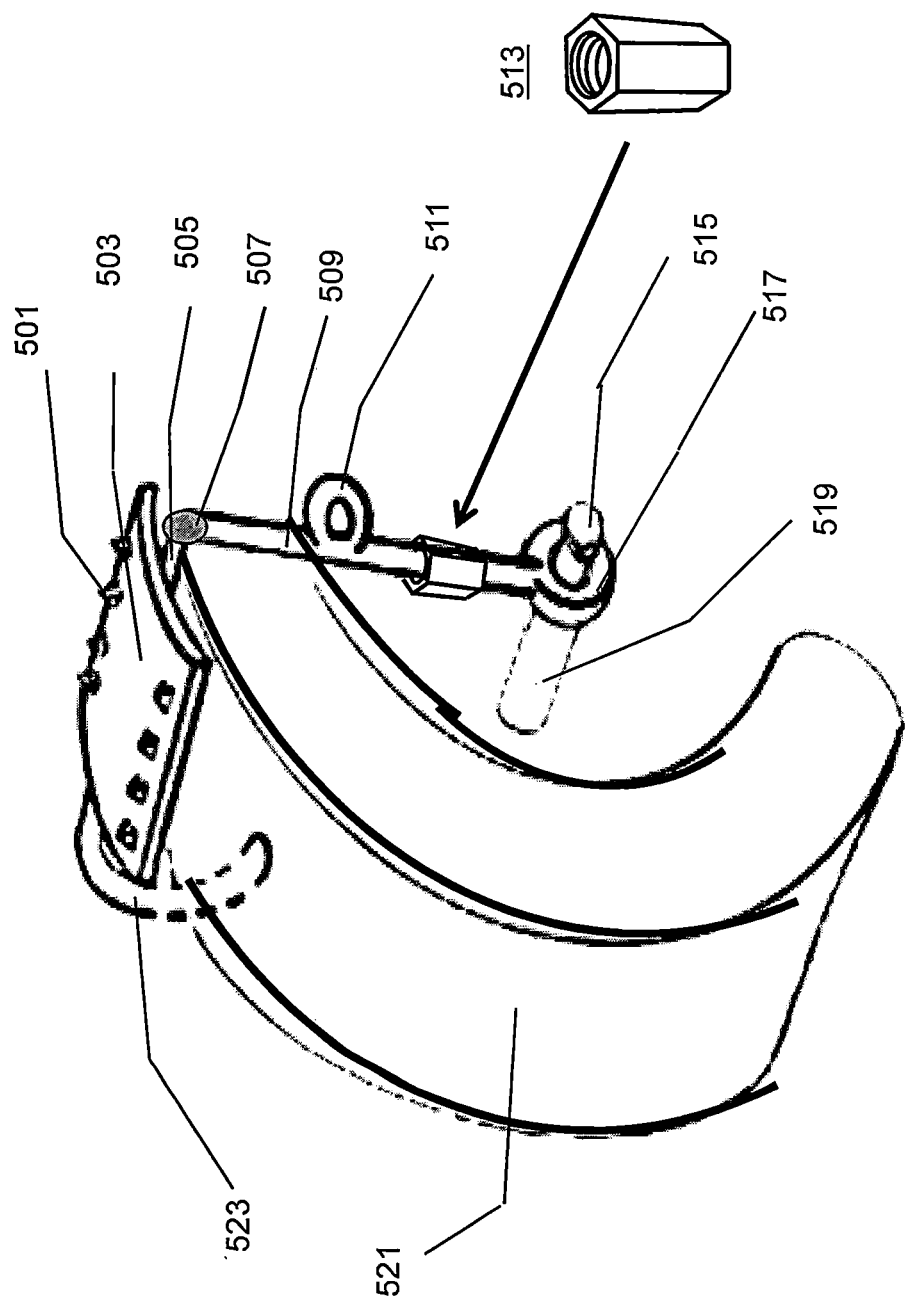
FIG. 5 illustrates a rod orthogonal traction component rotational coupling to a rod and with securing loop and extension nut coupler in and embodiment of the invention

FIG. 5 illustrates a rod orthogonal traction component rotational coupling to a rod and with securing loop and extension nut coupler in and embodiment of the invention In an embodiment of the invention a rod orthogonal traction component 503 is shown with distal end 523 bent tip to snugly hold a traction rod 509 in stable position with staying forces from a wheel well tire side tip 523, opposing staying forces from the outside tire 521 side, rod 509. The traction rod 509 components may be made of tough plastic, fiber or metal alloy material and have sufficient strength to support road traction from an orthogonal traction component 503 having titanium or other tough road friction resistant material protrusions 501 and or surface layers. In some embodiments the traction component 505 will be rotatably coupled a rod 509 at pivot 507 and in others the rod 509 will have a coupling nut 513 for minor adjustments. In still another embodiment a cable loop 511 is rigidly coupled to the rod 509. The rod 509 shown is rotatably coupled to a standard motor vehicle wheel lug bolt 519 and lug nut 515 through a rod 509 ring 517 end for anchoring the rod 509 to a wheel hub.

Therefore, while the invention has been described with respect to a limited number of embodiments, those skilled in the art, having benefit of this invention, will appreciate that other embodiments can be devised which do not depart from the scope of the invention as disclosed herein. Other aspects of the invention will be apparent from the following description and the appended claims.

What is claimed is:

1. A tire traction device for a motor vehicle wheel comprising:

the motor vehicle wheel with a tire and a lug configuration having a hub mounting plate coupled to the wheel with a lug bolt-nut set;

the mounting plate having an inner concentric ring of wheel bolt holes and an outer concentric ring of holes with a transition region from the inner hole ring to the outer concentric hole ring and conically outward from the inner to the outer concentric ring;

the outer ring having an at least 5 hole set for bolt-nut fastener coupling for at least 5 tire rods;

each tire rod coupled to the mounting plate, and outer ring hole set, positioned in the wheel radial plane having a rod length extending to the wheel tire tread;

each tire rod having two ends, a first end having a hole for coupling the mounting plate through an outside ring hole and a second end having a component orthogonal to the wheel radial plane, adjacent and parallel to the tire tread, the rod having a distal end with bent tip extending towards the wheel radial center, and each orthogonal component having two surfaces parallel to the tire tread, a first surface adjacent to the tire tread and a second surface facing away from the tire and adjacent to a road surface for providing traction to the tire under wheel rotation, such that an installed mounting plate on the motor vehicle wheel provides a way to increase wheel traction using a single nut per traction rod providing added wheel traction.

2. The tire traction device for a motor vehicle wheel as in claim 1 further comprising each rod having a rigid loop midway between the rod ends for threading a cable connecting all of the rods under tensioning together, adding stability to the traction device through rod force distribution.

3. The tire traction device for a motor vehicle wheel as in claim 1 further comprising orthogonal rod components rotationally coupled to the rod for tire radial size adjustment without additional components.

4. The tire traction device for a motor vehicle wheel as in claim 1 wherein the traction rod material is from a set of materials including plastic, fiber and metal alloy material.

5. The tire traction device for a motor vehicle wheel as in claim 1 further comprising the rod orthogonal component with distal end bent tip to hold the traction rod in place from a wheel well tire side.

6. A method for a motor vehicle wheel tire traction device comprising the steps of:

coupling a motor vehicle wheel with a lug configuration hub with a mounting plate coupled to the wheel with a lug bolt-nut set;

providing the mounting plate with an inner concentric ring of wheel bolt holes and an outer concentric ring of holes, the inner and outer rings having a transition region from the inner hole ring to the outer concentric hole ring and conically outward from the inner to the outer concentric ring;

providing the mounting plate outer ring with at least a 5 hole set for bolt-nut fastener coupling for at least 5 tire rods;

coupling each tire rod to the mounting plate, and outer ring hole set, the rods positioned in the wheel radial plane having a rod length extending to the tire tread;

having each tire rod with two ends, a first end coupled to the mounting plate through an outside ring hole for nut-and-bolt fastener and a second end having a component orthogonal to the wheel radial plane, adjacent and parallel to the tire tread, the rod having a distal end with bent tip extending towards the wheel radial center, and providing each rod with a distal end orthogonal component with two surfaces parallel to the tire tread surface, a first surface adjacent to the tire tread and a second surface facing away from the tire and adjacent a road surface for providing traction to the tire under wheel rotation, such that an installed mounting plate on the motor vehicle wheel provides a way to increase wheel traction using a single nut per traction rod providing added wheel traction.

7. The method for a motor vehicle wheel tire traction device as in claim 6 further comprising the steps of providing the rod a rigid loop midway between the rod ends for threading a cable connecting all of the rods under tensioning together, adding stability to the traction device through rod force distribution.

8. The method for a motor vehicle wheel tire traction device as in claim 6 further comprising the steps of having orthogonal rod components rotationally coupled to the rod for tire radial size adjustment without additional components.

9. The method for a motor vehicle wheel tire traction device as in claim 6 further comprising the steps of using traction rod material from a set of materials including plastic, fiber, composite and metal alloy material.

10. The method for a motor vehicle wheel tire traction device as in claim 6 further comprising the steps of providing the rod orthogonal component with distal end bent tip to hold the traction rod in place from a wheel well tire side.

\* \* \* \* \*